United States Patent [19]
Benton et al.

[11] Patent Number: 5,533,201
[45] Date of Patent: Jul. 2, 1996

[54] METHOD AND APPARATUS FOR SIMULTANEOUS INTERCONNECTION OF MULTIPLE REQUESTORS TO MULTIPLE MEMORIES

[75] Inventors: Michael K. Benton, Malvern; Anthony P. Gold, Wayne; Richard A. Schranz, Norristown, all of Pa.

[73] Assignee: Unisys Corporation, Blue Bell, Pa.

[21] Appl. No.: 283,975

[22] Filed: Aug. 1, 1994

Related U.S. Application Data

[63] Continuation-in-part of Ser. No. 207,318, Mar. 7, 1994.
[51] Int. Cl.[6] ................................................. G06F 13/00
[52] U.S. Cl. ........................ 395/280; 395/282; 395/310; 395/312
[58] Field of Search ................................. 395/325, 312, 395/310, 282, 280

[56] References Cited

U.S. PATENT DOCUMENTS

| | | | |
|---|---|---|---|
| 4,590,551 | 5/1986 | Mathews | 364/200 |
| 5,081,575 | 1/1992 | Hiller et al. | 395/325 |
| 5,327,570 | 7/1994 | Foster et al. | 395/800 |

Primary Examiner—Jack B. Harvey
Assistant Examiner—John Travis
Attorney, Agent, or Firm—Robert R. Axenfeld; Mark T. Starr

[57] ABSTRACT

A method and a switching system for connecting multiple requestors to multiple memory units simultaneously. This is accomplished by a switching system that employs multiplexing logic, control logic, multiple data input and output ports and a unique system interconnection topology. Independent data input ports comprised of multiplexing logic controlled by a control logic, simultaneously channel multiple fetch and store commands from the requestors to the memory units. Similarly, independent data output ports comprised of a second multiplexing logic controlled by a second control logic, simultaneously channels multiple return signals from the memory units to the requestors. The switching system of the present invention incorporates the unique system interconnection topology concept of feed-through boards and modular backplane boards. The feed-through boards coupled to the foreplane side of the backplane of a computer system and the modular backplane boards coupled to the backplane side of the backplane of a computer system, both serve to extend and manage the communication paths between the requestors and the memory units.

18 Claims, 13 Drawing Sheets

METHOD AND APPARATUS FOR SIMULTANEOUS INTERCONNECTION OF MULTIPLE REQUESTORS TO MULTIPLE MEMORIES

This is a Continuation-In-Part of application Ser. No. 8/207,318, entitled "Behind Backplane Expansion Board Apparatus and Method" filed Mar. 7, 1994.

BACKGROUND OF THE INVENTION

1. Field of the Invention

The present invention relates to an apparatus and method for providing a crossbar switching system for simultaneously interconnecting a multitude of processors to a multitude of memory units in a computer system in a point-to-point fashion.

2. Related Art

Due to the demand for ever greater data processing capacity and processing speed by end users, computer systems have evolved to incorporate multiple processors that share a common core data memory. These processors, often referred to as requestors, generally will perform various dedicated functions to improve system performance. Hence, it is possible for one processor to be dedicated solely for the purpose of processing data, while another processor will handle input/output functions between the computer system and external devices, while yet another processor will handle the movement of data between different parts of the core memory or the movement of data between a processor and the core memory. Each processor needs to access the common core memory for the purpose of reading and writing data while performing their respective functions. As the number of processors increases in a computer system, there is a corresponding increase in the demand to access the common core memory.

To handle increased demands, the design of the common core memory has likewise evolved to incorporate the concept of multiple memory units. A common core memory is divided into different segments, thereby, permitting different requestors to access different segments of common core memory simultaneously.

To accomplish this, one implementation incorporates shared memory buses between the multiple requestors and memory units. Arbitration is performed before requestors and memory units are granted access to shared memory buses. The factors considered by some arbitration logic include the priority of the request and the order in which the request was received. In effect, only one requestor may access the common core memory during any given moment.

Use of shared memory buses for functional control and data paths, has significant disadvantages. One is congestion created by a limited window of time in which a requestor may read and write data to the common core memory. Data requested by a requestor must return from the common core memory over the same memory buses further increasing congestion.

To eliminate congestion, some systems provide a dedicated memory bus for each requestor to the common core memory. However, this approach is costly and complicated. If a computer system is upgraded with an additional requestor, the system must add an additional bus and modify the common core memory to enable the new bus to be recognized by the core memory. This approach requires extensive modification to the computer system.

It may also be necessary to provide additional data paths by adding new pins to the requestor boards and new connectors on a backplane. The backplane is the main circuit board of a computer system into which other circuit boards are plugged. A backplane consists of a series of multiway sockets and internal wiring or buses for communication between various circuit boards and peripherals. The incorporation of dedicated memory buses requires additional data paths between each requestor and each memory unit. This will have the negative effect of further congesting the backplane which is already physically packed with internal wiring and buses. Another undesirable effect is the large insertion force and removal force that will be required for such a large number of pin connectors on the foreplane surface of the backplane.

SUMMARY OF THE INVENTION

The present invention is directed to a method and a switching system for connecting multiple requestors to multiple memory units simultaneously without the need to employ a shared memory bus. This is accomplished by a switching system that employs multiplexing logic, control logic, multiple data input and output ports and a unique system interconnection topology. The multiplexing logic is used to couple two requestors to three memory units in a direct point-to-point manner. The multiplexing logic controlled by the control logic, simultaneously channels multiple fetch and store commands from the requestors to one of three memory units. This scheme is further improved by the consolidation of the multiplexing logic and the control logic into a single data input port. One implementation of the present invention incorporates up to four data input ports. Since these data input ports are totally independent of each other, eight requestors can send commands to three memory units simultaneously.

A second multiplexing logic is used to couple three memory units to two requestors. The second multiplexing logic controlled by a second control logic, simultaneously channels multiple return signals from the memory units to one of two requestors. This scheme is further improved by the consolidation of the second multiplexing logic and the second control logic into a single data output port. One implementation of the present invention incorporates up to four data output ports. Since these data output ports are totally independent of each other, three memory units can return data to eight requestors simultaneously.

Additionally, the switching system of the present invention incorporates the unique system interconnection topology concept of feed-through boards and modular backplane boards. The feed-through boards coupled to the foreplane side of the backplane of a computer system and the modular backplane boards coupled to the backplane side of the backplane of a computer system, both serve to extend and manage the communication paths between the requestors and the memory units. The data input ports are also implemented on the feed-through boards, while the data output ports are implemented on the modular backplane boards.

The present invention expands the amount of available direct point-to-point connections between the requestors and memory units, thereby eliminating the need for a shared memory bus without significant modifications to both requestors and memory units. Another advantage of the present invention is the gain in density of additional direct electrical connections on the backplane of a computer system without incorporating additional pins and connectors to both requestors and memory units. It is generally known that additional point-to-point connections can be added in a computer system at the cost of increasing the number of pin connections on the backplane of a computer system. This results in circuit boards with many additional pins and connectors that require an enormous insertion and removal force.

Further features and advantages of the present invention, as well as the structure and operation of various embodiments of the present invention, are described in detail below.

DETAILED DESCRIPTION OF THE INVENTION

I. Hardware

Figure 1:
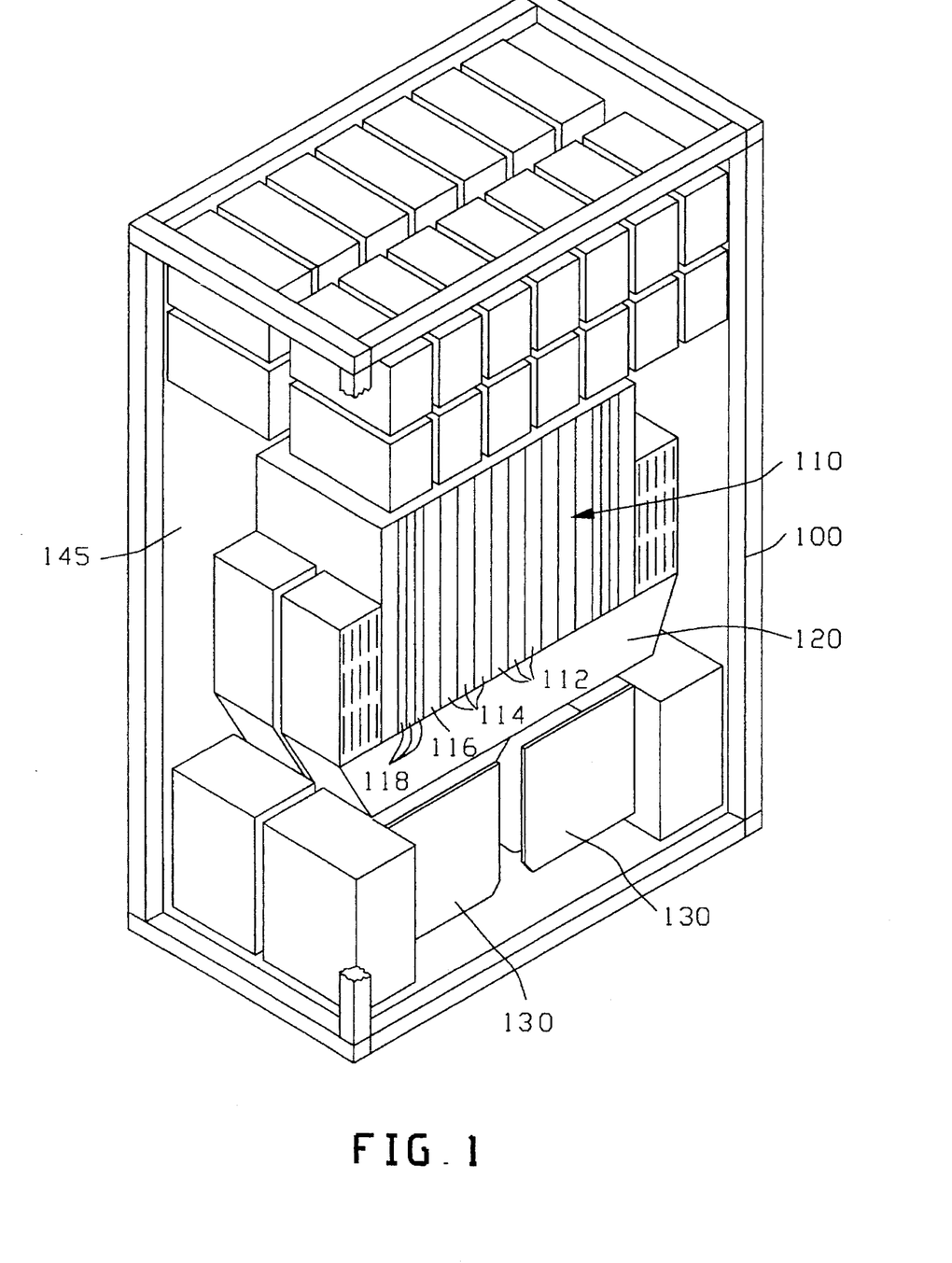
FIG. 1 illustrates a depiction of a computer system which serves as a preferred embodiment of the present invention.

This section is directed to a hardware implementation of a crossbar switching system for simultaneously interconnecting point-to-point, a multitude of requestors to a multitude of memory units, eliminating the need of shared common I/O buses. FIG. 1 illustrates a computer system according to a preferred embodiment of the present invention. A cabinet 100 is shown with the outer walls partially cut away to show the interior card rack mounting in the foreplane area of the backplane of the computer system. The system includes one or more system unit circuit cards 110 which are mounted above a plenum 120, which is coupled to a pair of blowers 130 located at the bottom of the cabinet 100. The backplane 145 is shown at the rear of the cabinet to which the circuit boards 110 connect. The figure shows a system which has a full complement of circuit boards 110 including input/output module (IOM) unit boards 112, central processing modules (CPM) unit boards 114, feed-through boards 116 and memory unit boards 118. In a preferred embodiment, a computer system is designed with two similar domains for the purpose of future expansion. The figure as shown is a system utilizing both domains.

Figure 2:
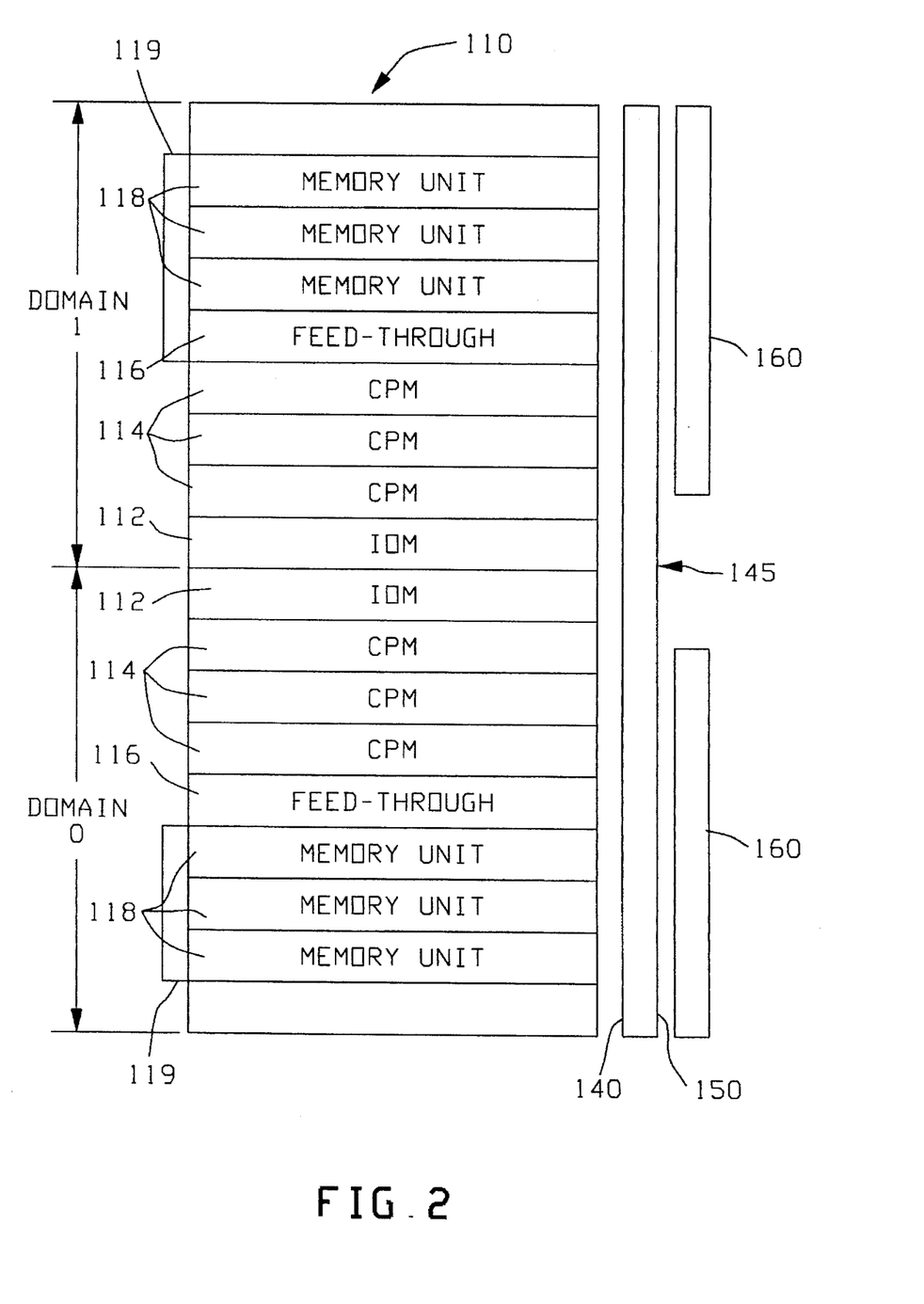
FIG. 2 illustrates a cross-sectioned view of a backplane and boards connected thereto in a preferred embodiment of the present invention.

Referring now to FIG. 2, is an overview cross-section of the computer system of a preferred embodiment, including circuit boards 110, foreplane jumper boards 119, backplane 145 and backplane boards 160. Backplane 145 has a foreplane side 140 on which are connected a plurality of circuit boards 110. Backplane 145 also has a backplane side 150 on which are connected the modular backplane boards 160 of a preferred embodiment of the present invention. As illustrated in the cross-section overview, the modular backplane boards 160 provide an additional set of electrical connections for circuit boards 110 in backplane 145. Further description of the implementation of these modular backplane boards in a preferred embodiment is disclosed in a parent application, U.S. Ser. No. 08/207,318 entitled "BEHIND BACKPLANE EXPANSION BOARD APPARATUS AND METHOD", filed on Mar. 7, 1994.

In a preferred embodiment of the present invention, circuit boards 110 are composed of CPM 114 and IOM 112 which are often referred to as requestors, memory units 118 and feed-through boards 116. Feed-through boards 116 are coupled between backplane 145 and foreplane jumper boards 119. The foreplane jumper boards 119 are in turn coupled to the foreplane connectors of the memory units 118. As illustrated, feed-through boards 116 and foreplane jumper boards 119 serve as a path extension mechanism to channel signals from the backplane connectors of requestors 112 and 114 to the foreplane connectors of memory units 118. A detailed description of this process is described below.

Figure 3:
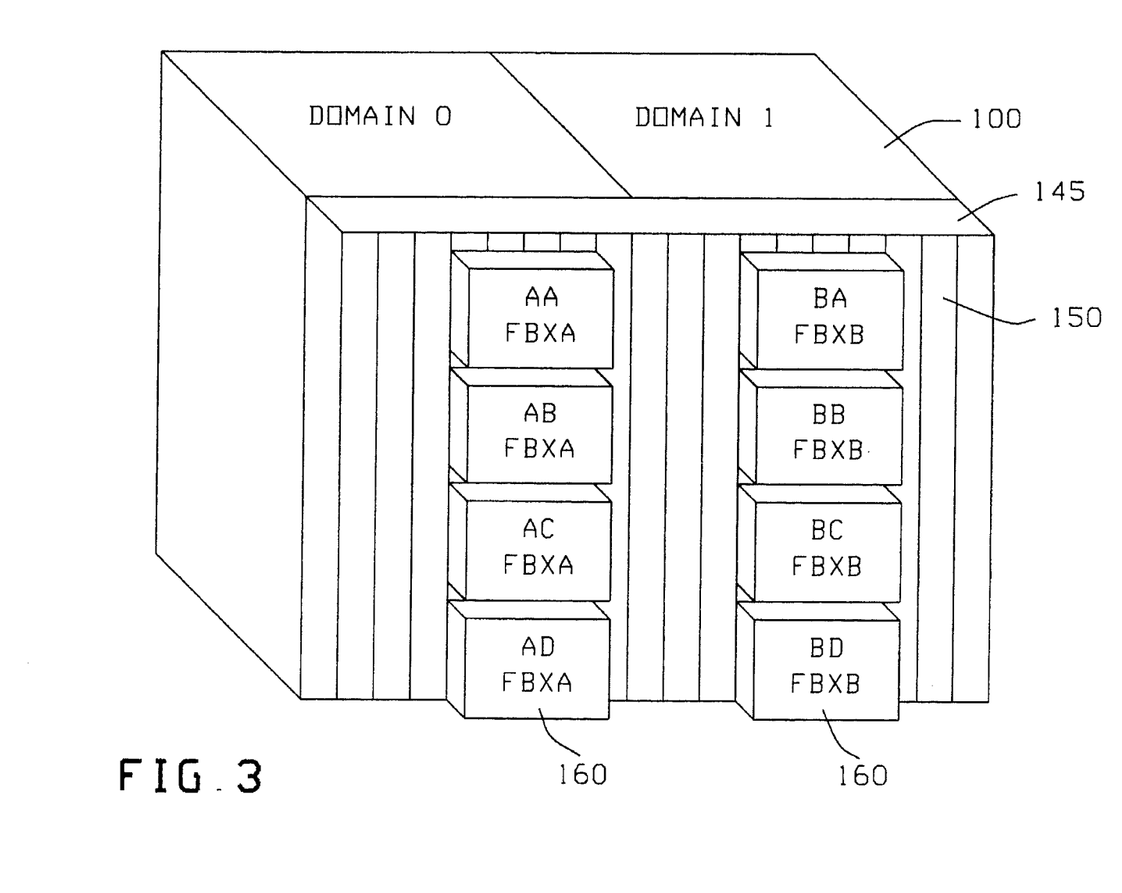
FIG. 3 illustrates a general view of the placement of backplane boards in relation to the backplane side of the backplane in the preferred embodiment.

Referring now to FIG. 3, is a simplified backview of the backplane portion of the computer system of the preferred embodiment, including modular backplane boards 160. The modular backplane boards 160 are coupled to the backplane side 150 of backplane 145. In a preferred embodiment, eight modular backplane boards 160 are connected to the backplane 145 in parallel with each other and perpendicular to requestors CPM 114 and IOM 112 connected to the foreplane side 140 of backplane 145 shown in FIG. 2.

Figure 4:
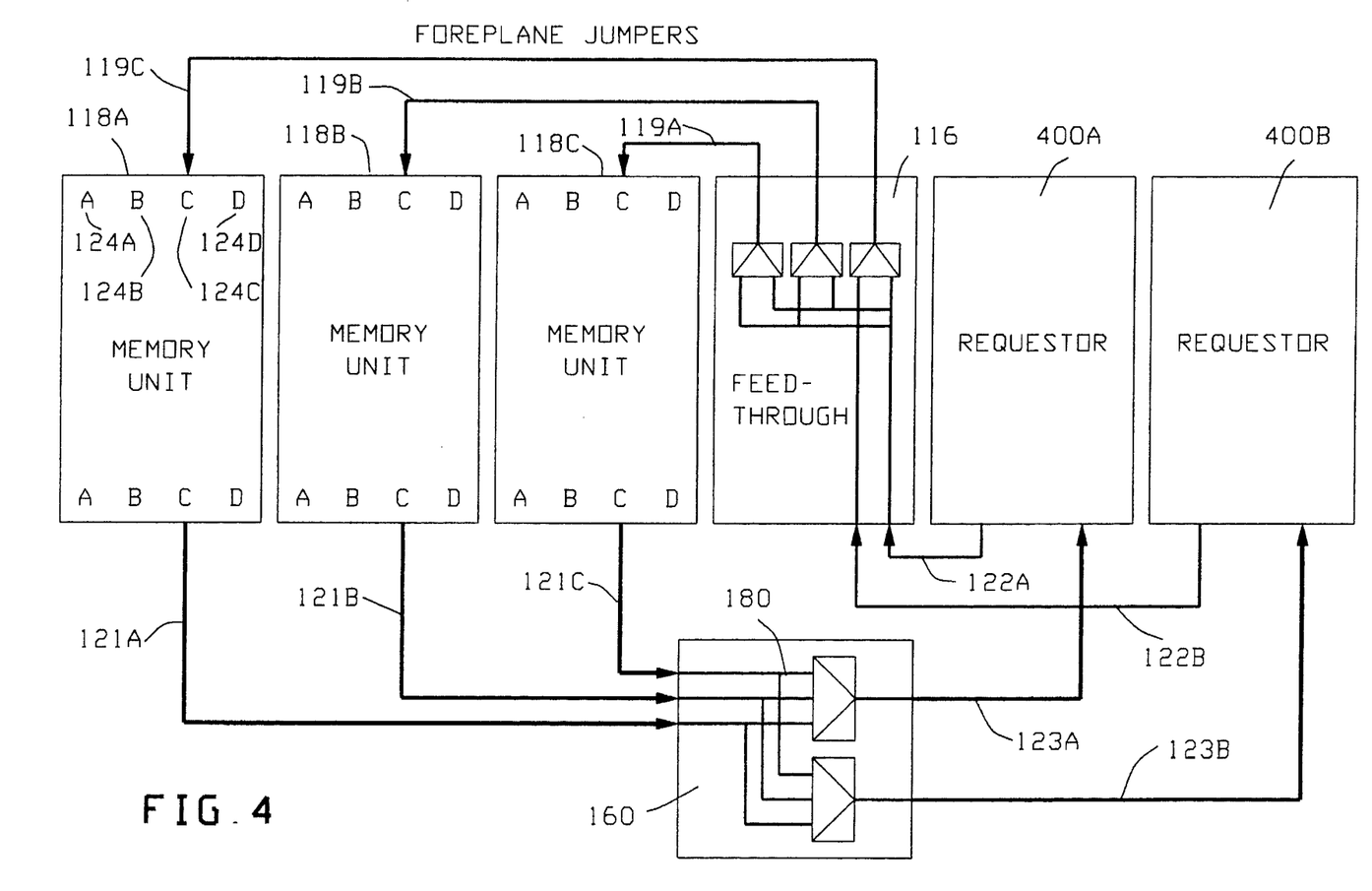
FIG. 4 is a high level block diagram of connections provided by the feed-through and backplane board in a preferred embodiment of the present invention.

FIG. 4 is a block diagram illustrating signal connections between the backplane and foreplane in a preferred embodiment. Two requestors 400A and 400B in FIG. 4 are coupled to backplane 145 through backplane connectors. As previously described, requestors 400A and 400B may include a CPM 114 or an IOM 112 in a preferred embodiment. In order for requestors 400A and 400B to properly perform their respective functions, they need to fetch and store data periodically from and to memory units 118 respectively.

Request signals for fetch and store operations generated by requestors 400A and 400B enter backplane 145 and travel over the electrical connections provided thereon to a feed-through board 116 through backplane connections 122A and 122B. Feed-through board 116 performs a series of path management functions to channel the request signals to memory units 118. Since memory units 118 accept inputs through its foreplane connectors, request signals are passed from feed-through board 116 to memory units 118 via foreplane jumper connections 119A–119C in a preferred embodiment. Foreplane jumper board 119 serves as a path extension mechanism by coupling the foreplane connector of the feed-through board 116 to the foreplane connectors of memory units 118.

FIG. 4 illustrates a switching system having multiple ports 124A–124D. Each port contains the necessary circuitry to interface in a point-to-point fashion between a pair of requestors 400A and 400B to three memory units 118A–118C. Mutiplexing logic couples each of the ports to each of the memories 118A–118C. The incorporation of multiple ports permits simultaneous communication between a plurality of requestors 400 and memory units 118. A detailed description of these ports is describe below.

Upon completion of fetch or store operations, memory units 118A–118C will generate results in the form of return signals. Return signals enter backplane 145 via backplane connections 121A–121C and travel over the electrical connections provided thereon to modular backplane board 160. The connections 121A–121C are managed by the functions performed by gate array 180 coupled to the modular backplane board 160. Modular backplane board 160 will perform a series of path management functions to channel the return signals via backplane connections 123A and 123B to requestors 400A and 400B for which the return signals are destined, upon receiving an access granted signal from the corresponding requestors 400A or 400B.

As illustrated, this routing is accomplished in a point-to-point manner by direct connections 122A–122B, 119A–119C, 121A–121C and 123A–123B, thus eliminating the need for a multi-source and multi-load memory bus and associated bus management problems and delays that afflict other computer system memory connections. In addition, the present invention was realized through an effective method of increasing the density of electrical connections on the system backplane in a modular fashion by incorporating a plurality of modular backplane boards 160 coupled to the backplane side 150 of backplane 145 shown in FIG. 2 and FIG. 3.

Figure 5:
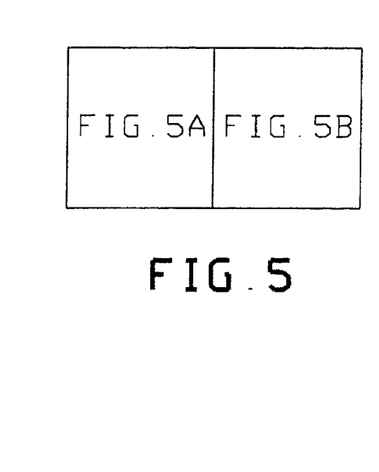
FIGS. 5, 5A and 5B are detailed block diagrams of connections employed in a fully configured system in a preferred embodiment of the present invention.
Figure 5A:
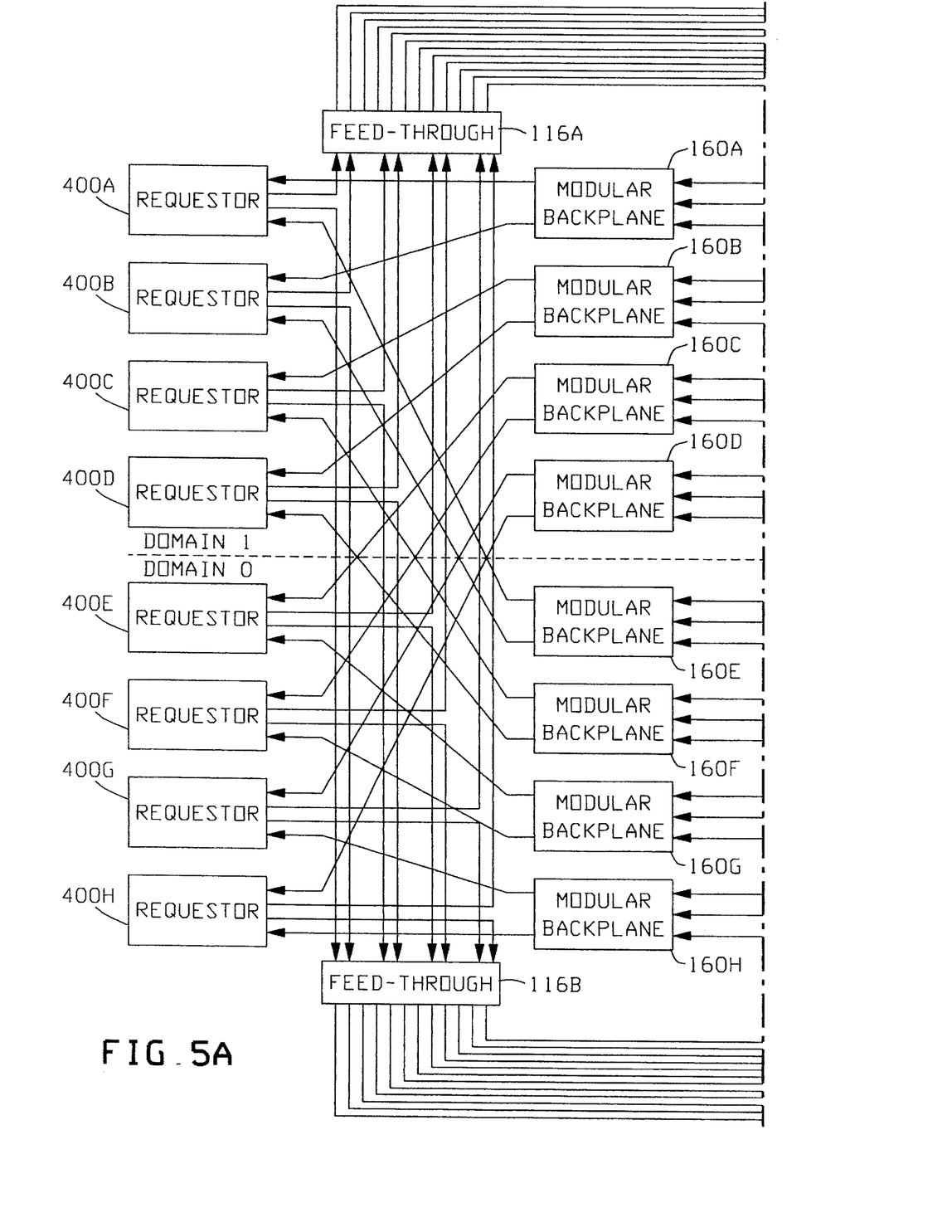
Figure 5B:
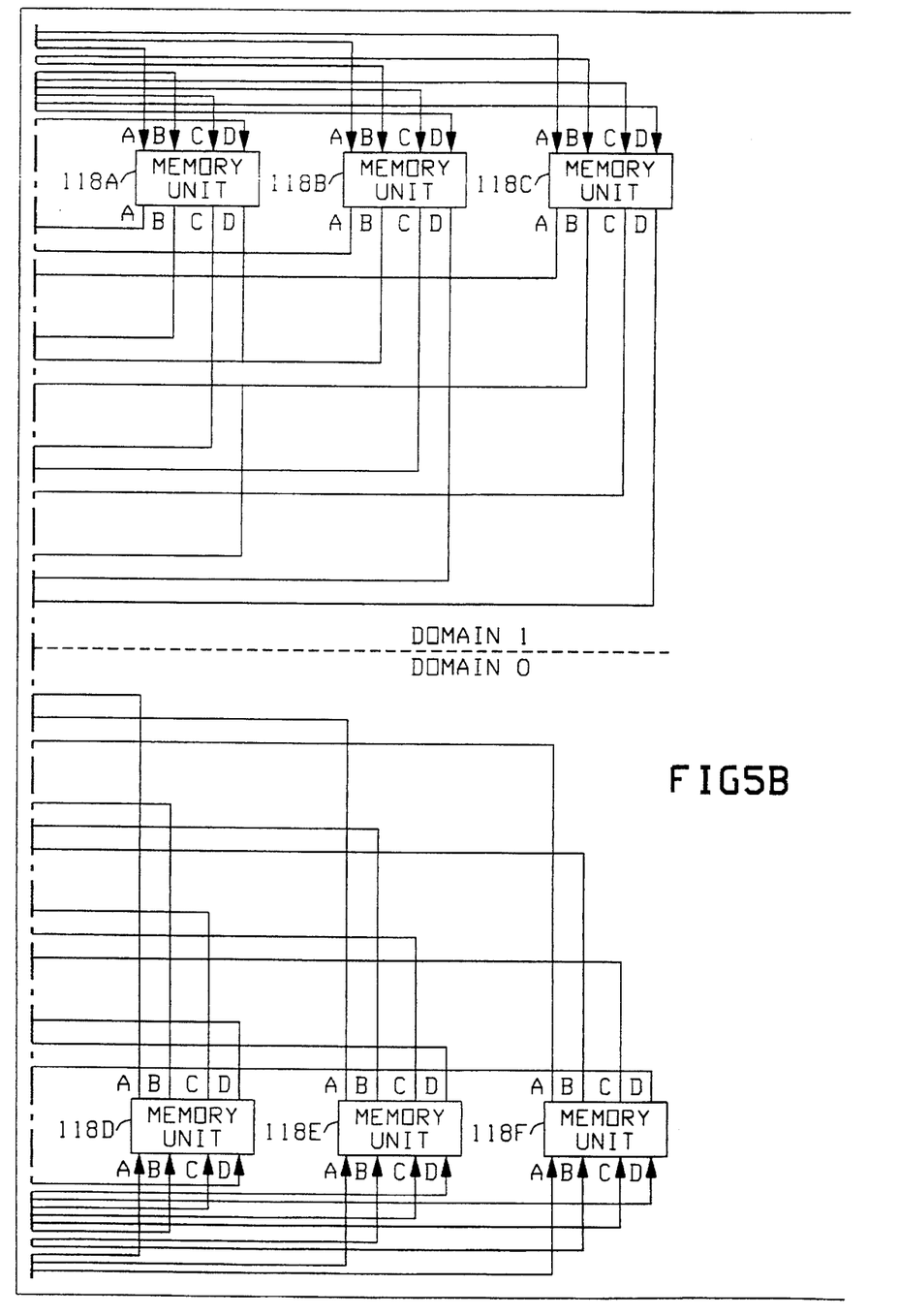

FIGS. 5, 5A and 5B show a fully configured system having six memory units 118A–118F and eight requestors 400A–400H. As previously described, these requestors comprise CPM 114 and/or IOM 112. Point-to-point cross-bar connectivity is provided by two feed-through boards 116A and 116B and eight modular backplane boards 160A-160H. Thus, eight requestors 400A–400H can simultaneously access in a point-to-point fashion to six memory units 118A–118F for the purpose of fetching and storing data.

Some of the many advantages of the present invention should now be readily apparent. For example, a novel system of providing point-to-point connections between requestors and memory units through a modular expansion of the paths available to these circuit boards on the system backplane have been disclosed. This is accomplished through the use of a crossbar switching system utilizing feed-through boards and modular backplane boards which provides several mechanical advantages in terms of size and ease of installation and removal. The additional improvement of providing logic arrays on the feed-through boards and modular backplane boards permits the :incorporation of new path management functions to be performed without substantial modification to the existing requestors and memory units.

Figure 6:
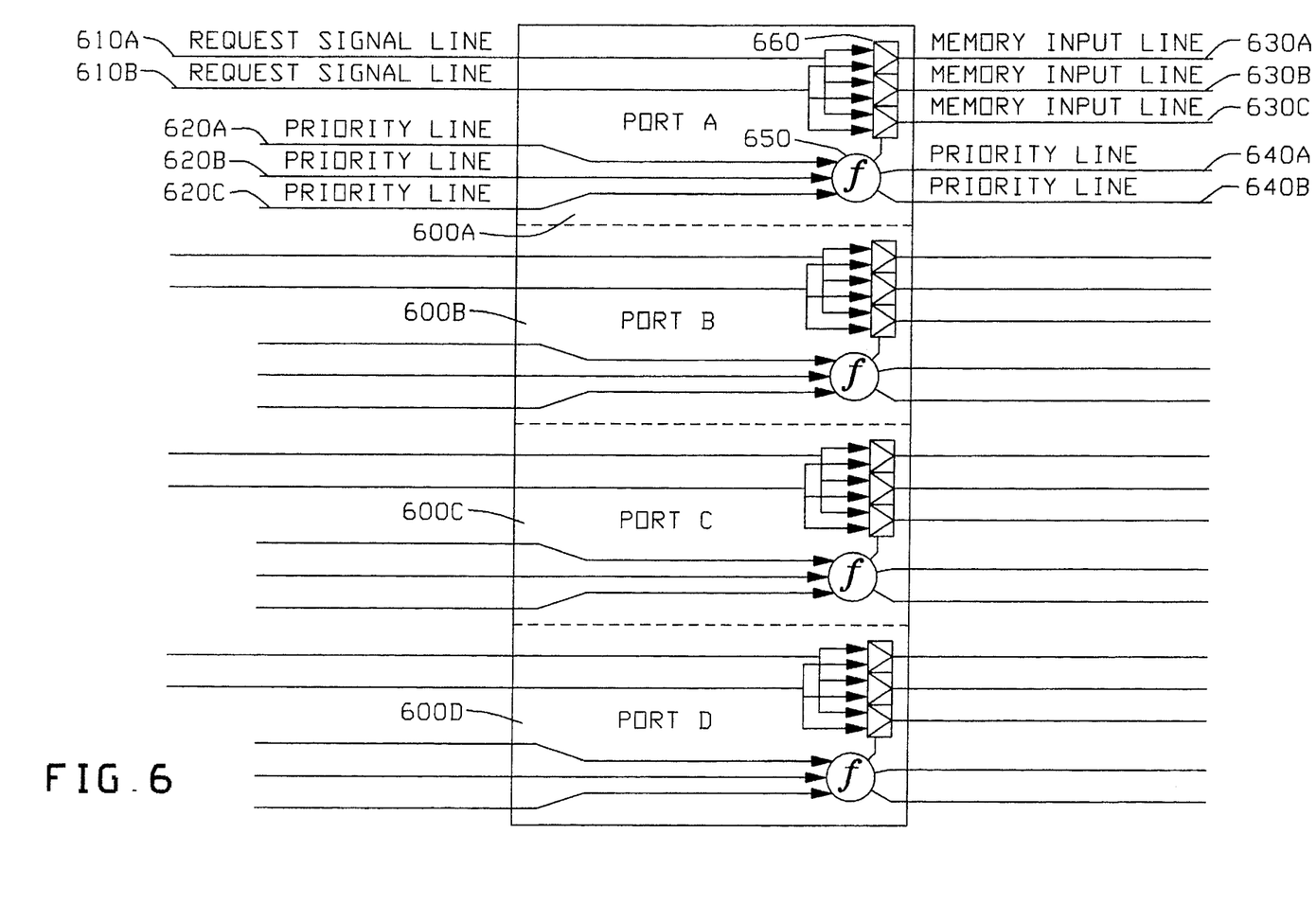
FIG. 6 is a block diagram of data input ports employed on the feed-through board in a preferred embodiment of the present invention.

FIG. 6 is a block diagram of data input ports 600A–600D employed on feed-through board 116 in a preferred embodiment of the present invention. Each data input port contains the necessary circuitry for interfacing between three memory units 18A–118C and a pair of direct connections such as 122A and 122B from two requestors 400A and 400B as shown in FIG. 4. The feed-through board 116 contains four identical data input ports 600A–600D that correspond to four memory unit input ports 124A–124D respectively as shown in FIG. 4. All data input ports 600A–600D and memory unit input ports 124A–124D are completely independent from the other three. Since data input ports 600A–600D on the feed-through board 116 are identical, a discussion on the functionality of port 600A will be representative of all of the data input ports 600.

For input port 600A, request signals from requestors 400A and 400B are received by feed-through board 116 through request signal lines 610A and 610B. Logic is provided in control circuit 650 to determine which memory unit 118A–118C the request signal is destined. If memory unit 118 is in a condition to receive the request signal, the signal is multiplexed through multiplexer 660 to the appropriate memory unit 118 via the corresponding memory input lines 630A–630C.

The path selection by control circuit 650 is accomplished by monitoring the priority lines 620A–620C. Since data input port 600A serves to perform a crossbar switching function for a pair of requestors 400A and 400B, feed-through board 116 must regulate the flow of request signals, so that inadvertent sending of request signals to a busy memory unit input port 124 can be avoided.

To illustrate, if feed-through board 116 receives consecutive request signals from two requestors 400A and 400B for memory unit 118A through data input port 600A, then feed-through board 116 will usually channel these request signals to memory unit 118A consecutively. However, it is possible that memory unit 118A may not be in condition to receive another request signal from data input port 600A when feed-through board 116 receives a second request signal destined for memory unit 118A on data input port 600A. If feed-through board 116 starts to channel a second request signal to a busy memory unit input port 124A, an error condition will result. Hence, control circuit 650 will not allow another request signal to be sent from the feed-through board 116 until a control word taken signal is received from memory unit input port 124A via priority lines 620A. The second request signal will be latched into a register until the memory unit input port 124A is available to receive another request signal.

The control word taken signals are also channelled back to the corresponding requestors 400A and 400B through control circuit 650 via priority lines 640A and 640B. Upon receiving the control word taken signal, requestors 400A and 400B will be permitted to send another request signal or to complete the previous request signal as received by memory unit 118A, such as sending data words in a store operation.

Priority lines 620A–620C serve a second function. For example, upon completion of a request, memory unit 118A must inform the corresponding requestor 400A that the request is completed and that memory unit 118A is in condition to send a return signal. Memory unit 118A issues a request for access signal to requestor 400A via priority lines 620A and 640A through the feed-through board 116. Memory unit 118A must receive an access granted signal from requestor 400A before sending data. Thus, feed-through board 116A as shown in FIGS. 5, 5A and 5B performs a crossbar switching function for request signal lines 610A–610H from eight requestors 400A–400H to three memory units 118A–118C.

Figure 7:
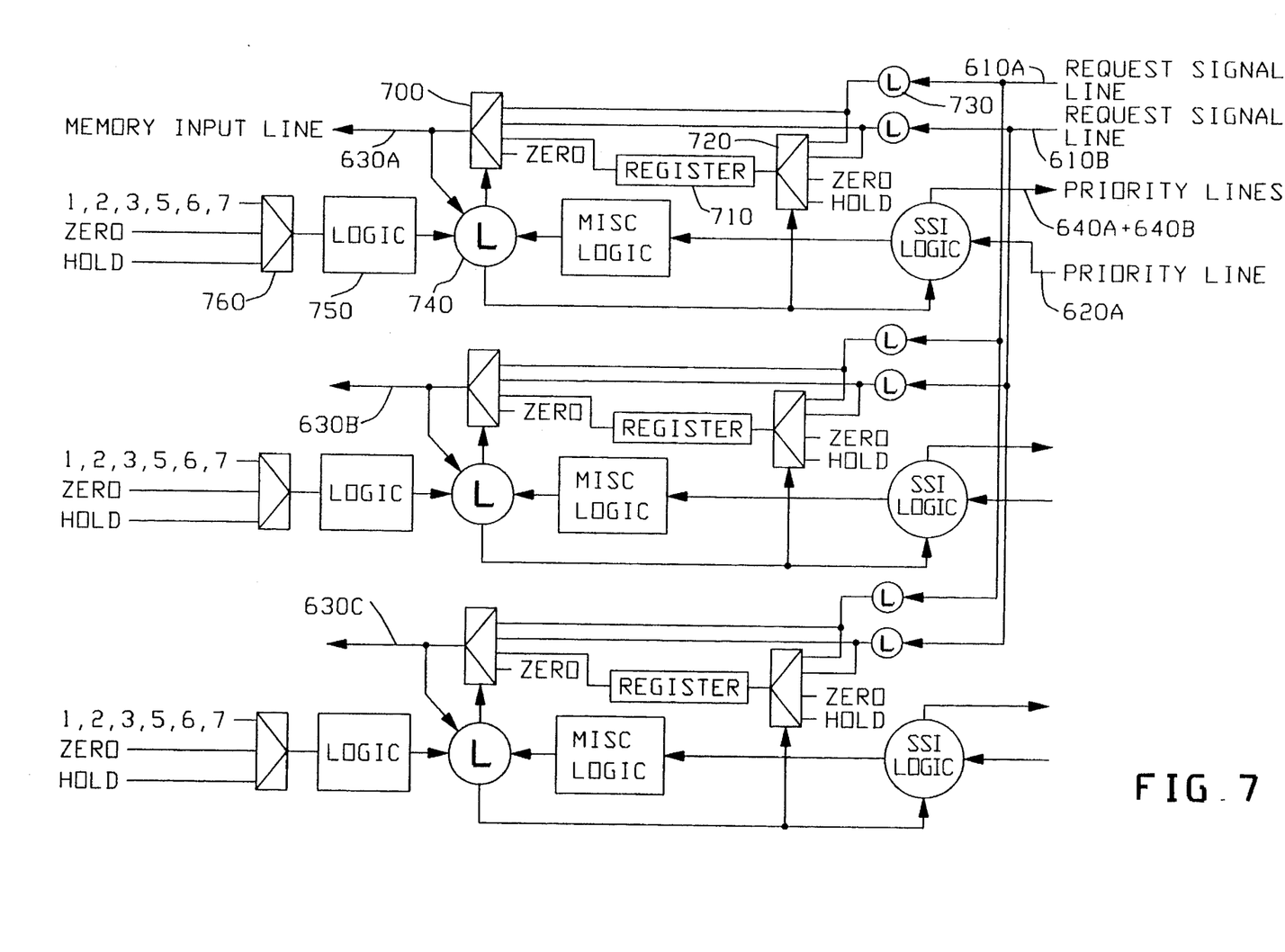
FIG. 7 shows a portion of the detailed logical circuit diagram of a gate array employed on the feed-through board in a preferred embodiment of the present invention.

FIG. 7 illustrates a portion of the detailed logical circuit diagram of the gate array employed on feed-through board 116 in a preferred embodiment of the present invention. Specifically, FIG. 7 illustrates a detailed logical circuit of a data input port 600A and the corresponding control logic on the feed-through board 116. Since, each data input port 600 on the feed-through board 116 is composed of three identical groups of control logic, one for each memory unit input line 630, a discussion on the functionality of one group of control logic will be representative of the other two groups.

Request signals from requestors 400A and 400B enter feed-through board 116 via request signal lines 610A and 610B. If two requestors 400A and 400B simultaneously send request signals to the same memory unit 118A through the same data input port 600A, control logic 730 will resolve the conflict. Control logic 730 will randomly latch one request signal into register 710 through multiplexer 720, while the other request signal will be channelled through multiplexer 700 by control logic 740 to memory unit 118A via memory unit input line 630A on the same clock that it was sent. The random latching of one request signal during a conflict is to prevent the degradation of performance on any one particular requestor 400.

Control logic 750 incorporates a decoder to keep control logic 740 abreast of the current operation that is being performed by memory units 118A. This is accomplished by monitoring predefined operation codes received from multiplexer 760. These predefined operation codes inform control logic 740 as to what operation is currently being performed and for which requestor 400. For example, an operation code of "2" may be defined as a store operation for requestor 400A while an operation code of "0" may be defined as an idle condition. Control logic 740 will not channel the next request signal until it detects an idle condition.

Upon completion of the first request signal, the latched request signal has priority over any new request signal that may enter feed-through board 116 destined to the same memory unit 118A on the same data input port 600A. Control logic 740 shifts the latched request signal out of register 710 and channels the signal through multiplexer 700 to memory unit 118A via memory unit input line 630A. Upon completion of all request signals, control logic 740 passes a zero with good parity through multiplexer 700 to memory unit input line 630A for the purpose of maintaining good parity on the line. The control logic on the feed-through board 116 are implemented on a gate array.

Figure 8:
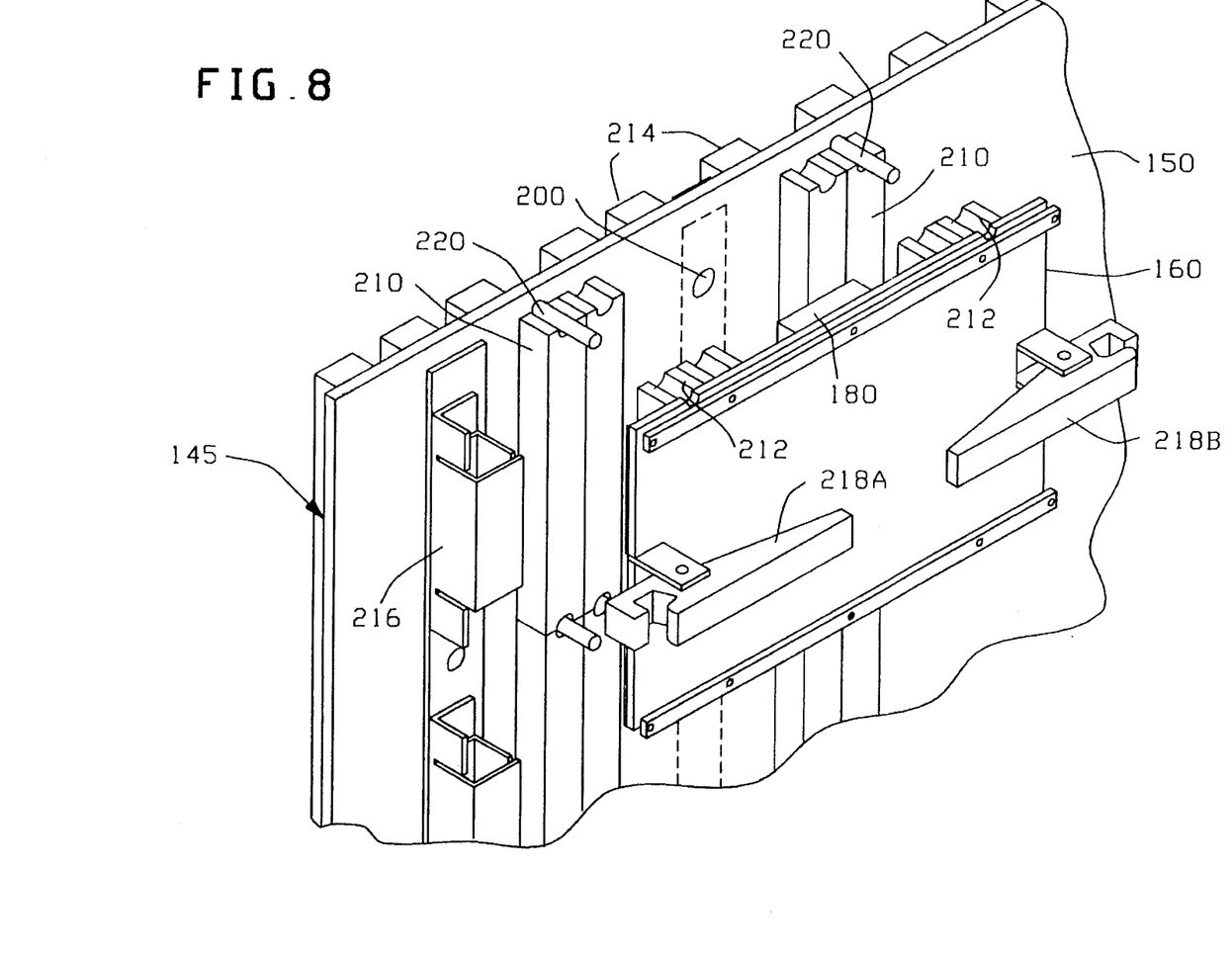
FIG. 8 shows a backplane board in relation to the backplane side of the backplane in a preferred embodiment of the present invention.

FIG. 8 illustrates the backplane side 150 of backplane 145. Electrical connectors 210 are disposed on backplane side 150 to provide connection for modular backplane board 160. Modular backplane board 160 also has electrical connectors 212 shown in alignment with backplane connectors 210. A portion of the electrical backplane connectors 214 for circuit boards 110 and the foreplane area is also shown at the top of the figure on the foreplane side 140 of backplane 145.

In a preferred embodiment of the present invention, stiffeners 216 are also provided on backplane side 150 to improve the durability of backplane 145. Levers 218 are coupled to modular backplane board 160 to facilitate insertion and removal of modular backplane board 160 to backplane 145. Also provided in a preferred embodiment are guide pins 220 to ensure the proper positioning of modular backplane board 160 when coupled to backplane connectors 210 via backplane board connectors 212.

An improvement of the present invention employed in a preferred embodiment is the inclusion of a gate array 180 on modular backplane board 160 to provide management functions for the signals passing through modular backplane board 160. The functions provided by gate array 180 will be further described herein.

Cooling for gate array 180 is provided via aperture 200 which is coupled to an air cooling system. Further description of the implementation of this cooling system in a preferred embodiment is disclosed in companion application U.S. Ser. No. 08/157,858 entitled "THROUGH BACKPLANE IMPINGEMENT COOLING APPARATUS", filed Nov. 24, 1993.

Figure 9:
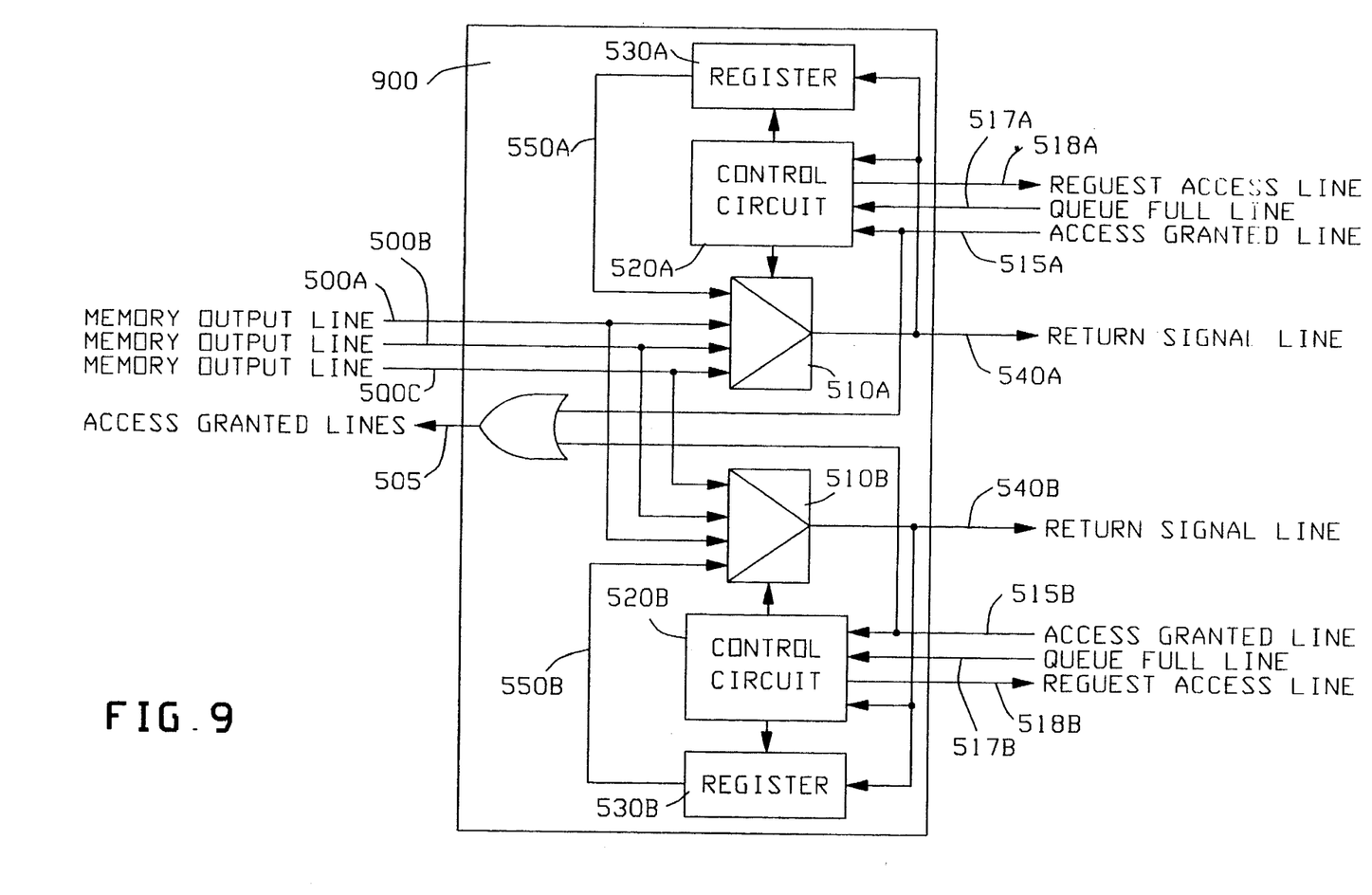
FIG. 9 is a block diagram of a data output port employed on the modular backplane board in a preferred embodiment of the present invention.

FIG. 9 is a detailed logic diagram of a data output port 900 which provides the functions performed by gate array 180 on modular backplane board 160 in a preferred embodiment of the present invention. Since, data output ports 900A–900D on modular backplane boards 160A–160H are identical, a discussion on the functionality of data output port 900A will be representative of all of the data output ports 900A–900D.

Memory output lines 500A–500C enter modular backplane board 160 from each of three memory units 118A–118C. The signals enter two multiplexers 510A and 510B, one for each of two requestors 400A and 400B to which return signals from three memory units 118A–118C may be destined. Control logic 520A and 520B determine the readiness of requestors 400A and 400B to receive a return signal by monitoring access granted signal lines 515A and 515B.

Access granted signal lines 515A and 515B enter modular backplane board 160 from each of two requestors 400A and 400B and couple to control circuit 520A and 520B respectively. Requestors 400A and 400B send access granted signals via access granted signal lines 515A and 515B when the requestors are in condition to receive return signals from data output port 900A. These access granted signals are also passed directly from requestors 400A and 400B to memory units 118A–118C via signal lines 505. Upon receipt of access granted signals, control circuit 520A and 520B multiplex return signals from memory units 118A–118C from memory output lines 500A–500C through multiplexer 510A and 510B to return signal lines 540A and 540B to destined requestors 400A and 400B.

Queue full signal lines 517A and 517B enter modular backplane board 160 from each of two requestors 400A and 400B and couple to control circuit 520A and 520B respectively. Requestors 400A and 400B send queue full signals via queue full signal lines 517A and 517B when the requestors are not in condition to receive return signals from data output port 900A. Upon receipt of queue full signals, control circuit 520A and 520B alternatively multiplex return signals from memory units 118A–118C from memory output lines 500A–500C through multiplexer 510A and 510B to register 530A and 530B respectively for temporary storage. The return signals are saved in queues 530A and 530B for later transmission.

Request access lines 518A and 518B exit modular backplane board 160 from each of two control circuit 520A and 520B and couple to requestors 400A and 400B respectively. If return signals are queued in queue 530A and 530B, then control circuit 520A and 520B issue requests for access using request access lines 518A and 518B to requestors 400A and 400B respectively to deliver a queued return signal through multiplexer 510A and 510B via signal lines 550A and 550B. Such requests appear to requestors 400A and 400B as simply another request for delivery of a return signal from an additional memory unit 118. Upon receipt of access granted signals, control circuit 520A and 520B multiplex queued return signals from registers 530A and 530B from lines 550A and 550B through multiplexer 510A and 510B to return signal lines 540A and 540B to destined requestors 400A and 400B.

Thus, modular backplane board 160 performs a cross-bar function for the memory output lines 500A–500C from three memory units 118A–118C to a pair of requestors 400A and 400B. While the logic shown in FIG. 9 performs the function of multiplexing three memory units 118A–118C to two requestors 400A and 400B, in a preferred embodiment a plurality of such modular backplane boards 160 may be employed advantageously with a plurality of memory units 118 and requestors 400.

II. Operation.

Figure 10:
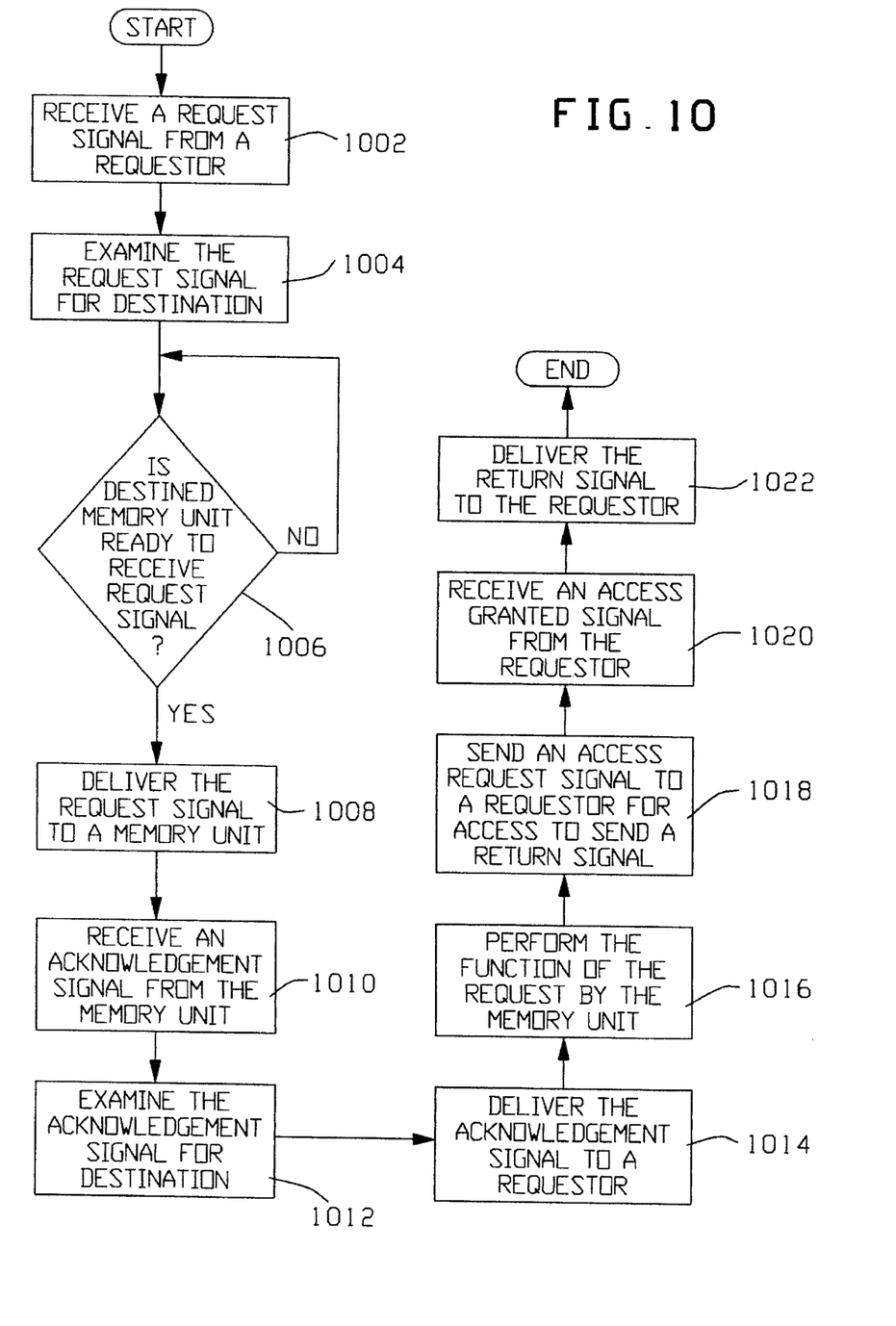
FIG. 10 is a flowchart diagram which illustrates the handling of a request signal as it occurs in the switching system in a preferred embodiment of the present invention.
Figure 11:
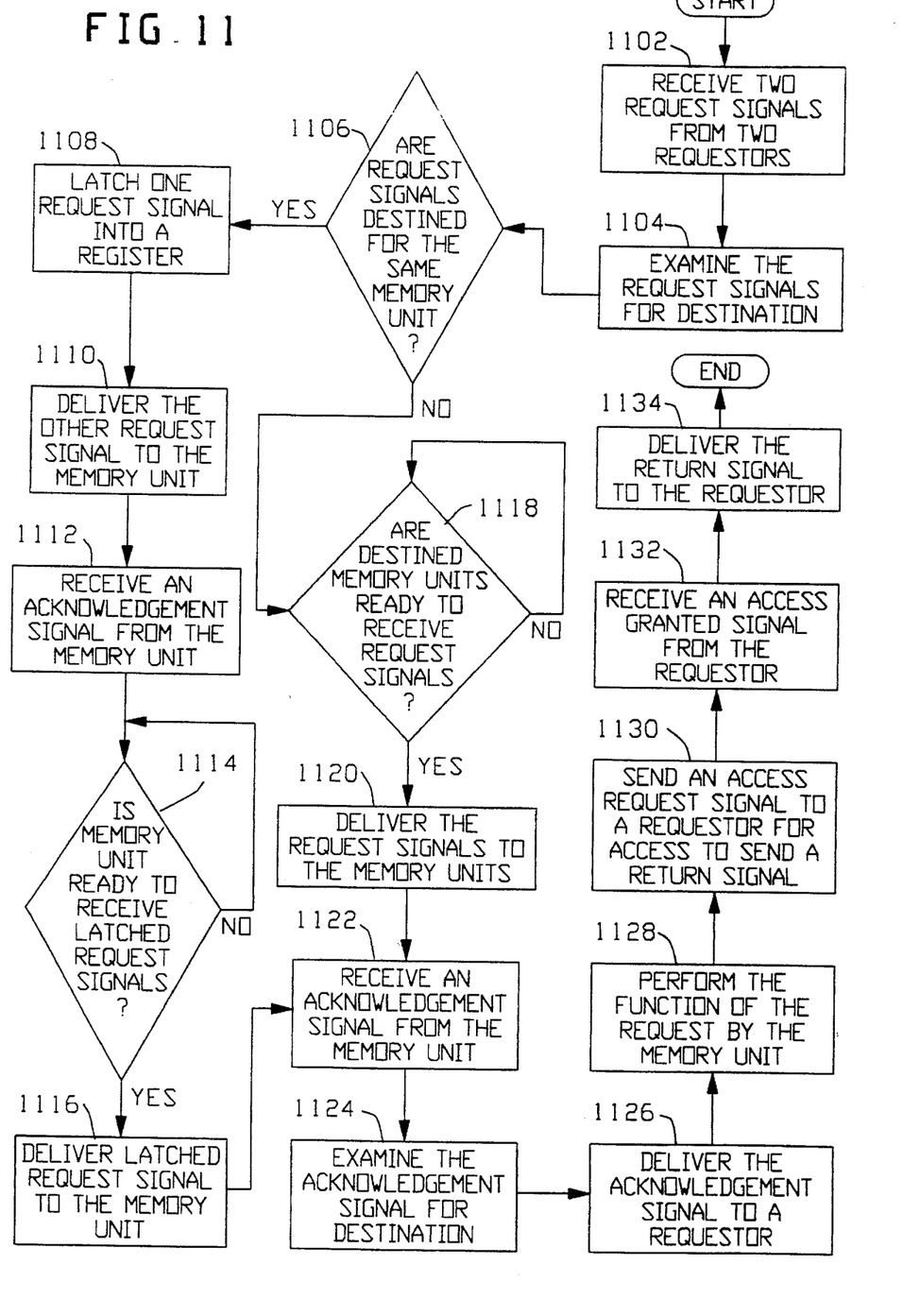
FIG. 11 is a flowchart diagram which illustrates the handling of multiple request signals to the same memory unit in a preferred embodiment of the present invention.
Figure 12:
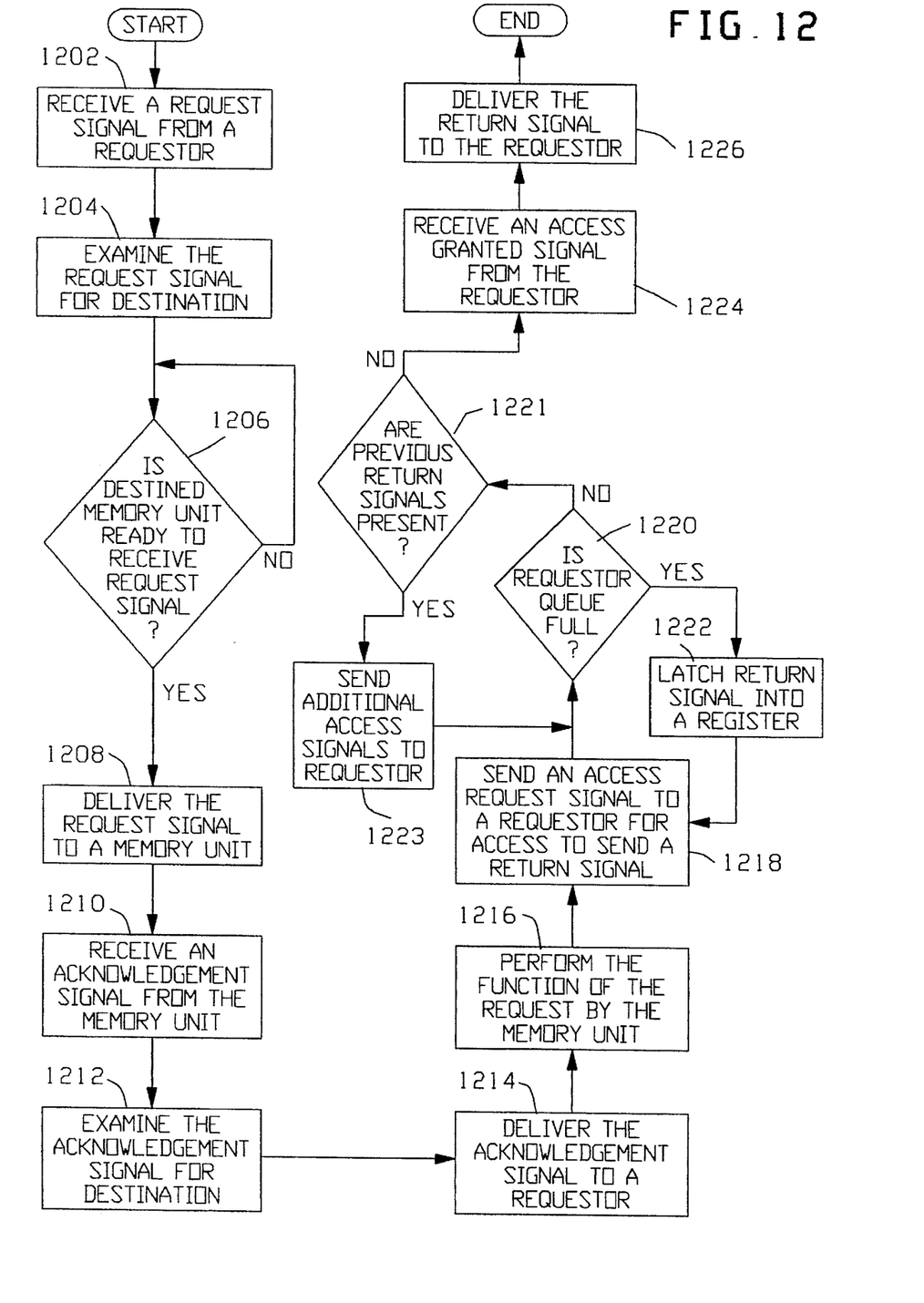
FIG. 12 is a flowchart diagram which illustrates the handling of a request signal when the requestor queue is full as it occurs in the switching system in a preferred embodiment of the present invention.

Referring to FIGS. 10, 11, and 12, the process of handling request signals by a switching system in a preferred embodiment is described. At step 1002 of FIG. 10, the switching system receives a request signal via request signal line 610 to perform either a fetch or store operation from a requestor 400. The switching system, at step 1004 determines which memory unit 118 the request signal is destined for. Having determined the destination of the request signal, the switching system checks at step 1006, to see if destined memory unit 118 is in a condition to receive the request signal via priority line 620. This is accomplished by verifying that an acknowledgement signal was actually received from the destined memory unit 118 from a previous transmission of a request signal. If so, the switching system delivers the request signal to memory unit 118 at step 1008 via memory input line 630. If memory unit 118 is not ready to receive the request signal, then the switching system holds the request signal until the memory unit 118 is ready to receive the request signal.

At step 1010, the memory unit 118 acknowledges the receipt of the request signal and indicates that it is now ready to receive another request signal or the associated data words that accompany a request signal for a store operation via priority line 620. Having received the acknowledgement signal, the switching system at step 1012 determines which requestor 400 the acknowledgement signal is destined for and delivers the acknowledgement signal to requestor 400 at step 1014 via priority line 640.

At step 1016, memory unit 118 performs either the fetch or store operation dictated by the request signal. Upon completion of the operation, the memory unit 118 will issue an access request signal for permission to send a return signal to requestor 400. This access request signal is sent by the switching system to requestor 400 at step 1018 via request access line 518. The switching system receives an access granted signal from requestor 400 via access granted line 515 at step 1020, whereby the switching system delivers return signal to requestor 400 at step 1022 via return signal line 540.

Referring to FIG. 11, the process of handling multiple request signals to the same memory unit 118 by a switching system in a preferred embodiment is described. At step 1102 of FIG. 11, the switching system receives two request signals from two requestors 400. The switching system, at step 1104 determines which memory unit 118 the request signals are destined for. If the switching system at step 1106 determines that the request signals are destined for different memory units 118, then the process is continued from steps 1118 to steps 1134 which are identical to steps 1006 through 1022 as described above in FIG. 10 with the request signals being sent to different memory units 118.

If the switching system at step 1106 determines that the request signals are destined to the same memory unit 118, then the switching system at step 1108 arbitrarily latches one request signal into a register 710, while delivering the other request signal to memory unit 118 at step 1110 via memory input line 630. At step 1112, memory unit 118 acknowledges the receipt of the request signal and indicates that it is now ready to receive another request signal or the associated data words that accompany a request signal for a store operation via priority line 620. If the switching system determines at step 1114 that memory unit 118 is in the midst of receiving a request signal for a store operation, the switching system holds the latched request signal in register 710 until all the data words have been received by memory unit 118 from the requestor 400 via request signal line 610.

When the switching system at step 1114 determines that all data words from the previous request signal for a store operation have been received by the memory unit 118 or that the previous request signal was for a fetch operation, then the switching system delivers the latched request signal to memory unit 118 at step 1116 via memory input line 630. The process then continues from steps 1122 to steps 1134 which are identical to steps 1010 through 1022 as described above in FIG. 10.

Referring to FIG. 12, the process of handling a request signal when the requestor queue is full by a switching system in a preferred embodiment is described. The steps 1202 through 1218 are identical to steps 1002 through 1018 as described above in FIG. 10.

The switching system at step 1220 of FIG. 12 determines if the requestor queue is full. If so, the switching system latches the return signal into a register 530 at step 1222. The switching system then continues to send an access request signal to requestor 400 via request access line 518 for access to send a return signal at step 1218. When the switching system at step 1220 of FIG. 12 determines that the requestor queue is not full, the switching system receives an access granted signal from requestor 400 at step 1224 via access granted line 515, whereby the switching system delivers return signal to requestor 400 at step 1226 via return signal line 540.

Obviously many modifications and variations of the present invention are now possible in light of the above teachings. It is therefore to be understood that the foregoing embodiments are presented by way of example only in that it is in the spirit of the claims attached hereto that the invention may be practiced other than as specifically described.

What is claimed:

1. A switching system for connecting a plurality of requestors to a plurality of memory units without the need to employ a shared memory bus, comprising:

a first multiplexer, having input terminals coupled to the requestors and output terminals coupled to the memory units, to transfer fetch and store commands and data from the requestors to the memory units;

a first control logic means, coupled to said first multiplexer, for receiving commands from requestors indicating fetch and store operations, and for selecting one of said input terminals to be coupled to one of said output terminals of said first multiplexer for transferring fetch and store commands and data to the memory units from the requestors, wherein said first control logic means selects the input and output terminals upon receiving said commands;

a second multiplexer, having input terminals coupled to the memory units and output terminals coupled to the requestors, to transfer data from said memory units to one of said requestors; and a second control logic means, coupled to said second multiplexer, for selecting one of said input terminals to be coupled to one of said output terminals of said second multiplexer for transferring data to the requestors, wherein said data is transferred from the memory unit to the requestor, upon said second control logic means receiving an access grant signal from the requestor.

2. The switching system of claim 1, further comprising:

a backplane means having a backplane side and a foreplane side, wherein said requestors and said memory units are coupled to said foreplane side of said backplane means.

3. The switching system of claim 2, wherein:

said first multiplexer and first control logic means are implemented on a feed-through board coupled to said foreplane side of said backplane means.

4. The switching system of claim 3, further comprising:

a foreplane jumper means for channelling data signals from said feed-through board to said memory units, wherein said feed-through board and said memory units are coupled to said foreplane jumper means.

5. The switching system of claim 4, wherein:

said second multiplexer and second control logic means are implemented on a modular backplane board coupled to said backplane side of said backplane means.

6. The switching system of claim 1, wherein said first multiplexer and said first control logic are consolidated into at least one data input port.

7. The switching system of claim 1, wherein said second multiplexer and said second control logic are consolidated into at least one data output port.

8. The switching system of claim 1, wherein said first control logic means further comprising:

an arbitration means coupled to said first multiplexer for resolving conflicts from said fetch and store commands from said requestors.

9. The switching system of claim 1, wherein said second control logic means further comprising:

a queue full control logic means for receiving commands from said requestors indicating a queue full condition on said requestors; and a queue means coupled to said second multiplexer for storing said data from said memory units.

10. In a computer system with a plurality of requestors and memory units, a method of managing communication between said plurality of requestors and memory units, comprising the steps of:

receiving a request signal from said requestor;

examining said request signal to determine which memory unit said request signal is destined for;

determining if said memory unit is ready to receive said request signal;

delivering said request signal to said memory unit through a first multiplexer implemented on a feed-through board if said memory unit is in a state to receive said request signal;

receiving an acknowledgement signal from said memory unit confirming the receipt of the request signal;

examining said acknowledgement signal to determine which requestor said acknowledgement signal is destined for;

delivering said acknowledgement signal to said requestor;

performing the function of said request signal by said memory unit;

sending an access request signal to said requestor for permission to send a return signal to said requestor;

receiving an access granted signal from said requestor; and delivering said return signal to said requestor through a second multiplexer implemented on a modular backplane board if said requestor is in a state to receive said return signal.

11. The method of claim 10, further including the steps of:

determining if two request signals are destined for the same memory unit when received by first multiplexer at the same time;

latching arbitrarily one of said request signal to a register; and delivering the other of said request signal to the destined memory unit on the same clock that it was sent;

receiving an acknowledgement signal from said memory unit confirming the receipt of the request signal;

determining if said memory unit is in condition to receive said latched request signal; and delivering said latched request signal to the destined memory unit.

12. The method of claim 10, further including the steps of:

determining if a requestor queue is full;

queuing said return signal if said requestor queue is not in a state to receive said return signal; and reissuing said queued return signal to said requestor when said requestor queue is in a state to receive said queued return signal.

13. The switching system of claim 2, wherein:

said second multiplexer and said second control logic means are implemented on a modular backplane board coupled to said backplane side of said backplane means.

14. The switching system of claim 13, wherein:

said first multiplexer and said first control logic means are implemented on a feed-through board coupled to said foreplane side of said backplane means.

15. The switching system of claim 13, wherein:

said first multiplexer and said first control logic means are consolidated into at least one data input port.

16. The switching system of claim 13, wherein:

said second multiplexer and said second control logic means are consolidated into at least one data output port.

17. The switching system of claim 13, wherein said first control logic means further comprising:

an arbitration means coupled to said first multiplexer for resolving conflicts from said fetch and store commands from said requestors.

18. The switching system of claim 13, wherein said second control logic means further comprising:

a queue full control logic means for receiving commands from said requestors indicating a queue full condition on said requestors; and a queue means coupled to said second multiplexer for storing said data from said memory units.

* * * * *